United States Patent [19]

Jefferson

[11] Patent Number: 4,875,294

[45] Date of Patent: Oct. 24, 1989

[54] GAUGE FOR DETERMINING DEPTH OF CUT IN KEYS AND THE LIKE

[76] Inventor: Robert C. Jefferson, 1209 E. 2nd Ave., Lenoir City, Tenn. 37771

[21] Appl. No.: 286,260

[22] Filed: Dec. 19, 1988

[51] Int. Cl.⁴ .................................................. G01B 5/20
[52] U.S. Cl. ........................................... 33/539; 33/792
[58] Field of Search ............. 33/147 R, 169 R, 172 R, 33/143 F, 539, 540, 519, 169 B

[56] References Cited

U.S. PATENT DOCUMENTS

| | | | |
|---|---|---|---|
| 2,021,201 | 11/1935 | Roos | 33/539 |
| 2,817,149 | 12/1957 | Broatch | 33/143 F |
| 3,113,386 | 12/1963 | Bolfar | 33/172 R |
| 3,826,010 | 7/1974 | Finley | 33/172 R |
| 4,090,303 | 5/1978 | Uyeda | 33/539 |

FOREIGN PATENT DOCUMENTS

| | | | |
|---|---|---|---|
| 1623243 | 9/1970 | Fed. Rep. of Germany | 33/147 R |
| 0669145 | 7/1964 | Italy | 33/147 R |

*Primary Examiner*—William A. Cuchlinski, Jr.
*Assistant Examiner*—Christopher Fulton
*Attorney, Agent, or Firm*—Pitts and Brittian

[57] ABSTRACT

A device for quickly and accurately determining the depth of cuts in a key, and for other depth determinations associated therewith. This device has a fixed anvil member having a flat top surface, as a reference surface, with a transverse slot to accept a second edge of doubly-cut key. A tip member having a selected configuration is biased toward this reference or "zero position" surface. Deviation of the tip member away from this reference surface is displayed in a visual manner on a dial indicator, a digital readout indicator or the like. The dimensioning of all the cuts of a key can be performed in seconds to accuracies of about 0.0005 inch. The cuts to be dimensioned can be in edges of the key or in flat side surfaces. Also, the pins of a lock tumbler can also be dimensioned with the embodiments of the invention.

19 Claims, 2 Drawing Sheets

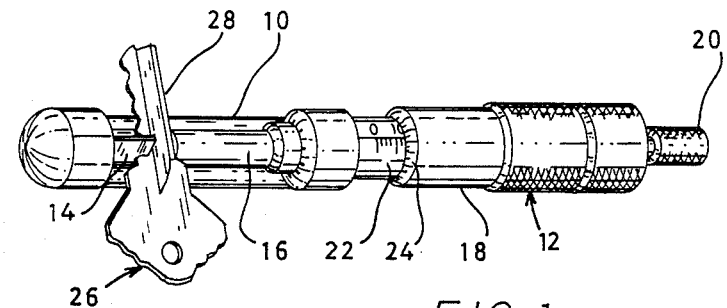
FIG. 1 PRIOR ART
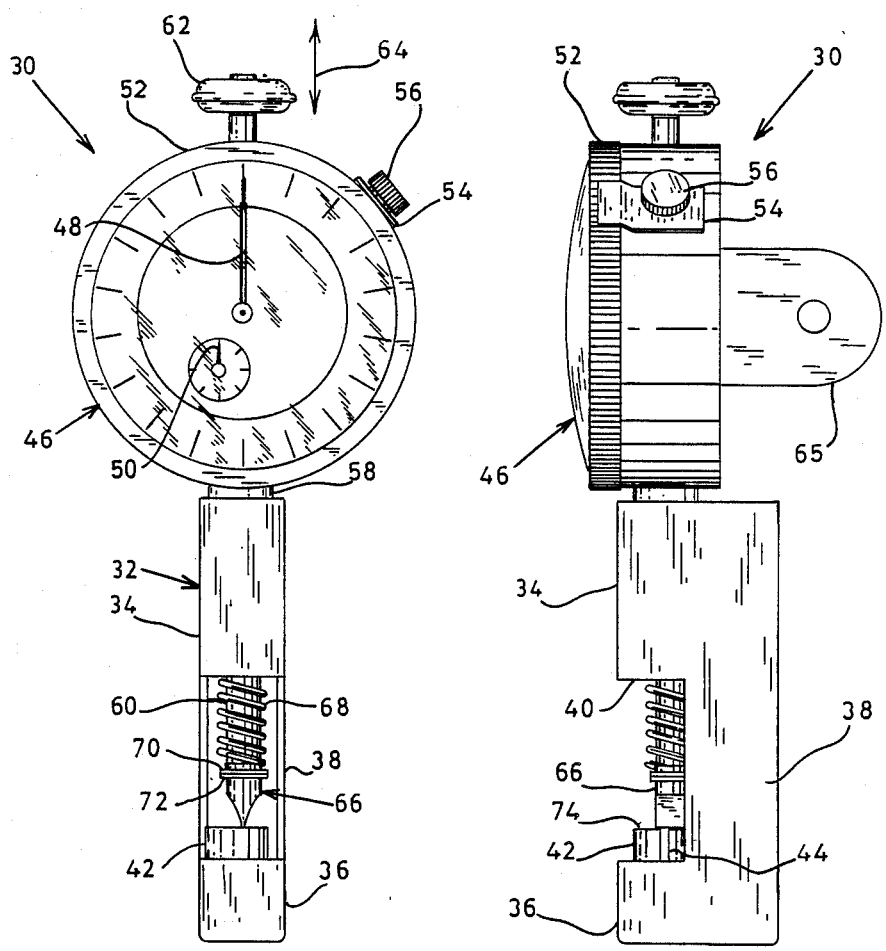
FIG. 2
FIG. 3

GAUGE FOR DETERMINING DEPTH OF CUT IN KEYS AND THE LIKE

This invention was the subject matter of Disclosure Document No. 187,603, filed in the U.S. Patent and Trademark Office on Mar. 2, 1988.

TECHNICAL FIELD

This invention relates generally to size determining gauges, and more particularly to an improved gauge for determining the depth of cut in keys and like objects.

BACKGROUND ART

In the locksmith art it is often necessary to determine the depth of cut of existing keys. This may be necessary, for example, in identifying a particular lock associated with a key, for making tumbler pins of the correct length, or for many other reasons. One important use is the determination of correct (or incorrect) cutting on a key machine to assure proper operation of the key in its associate lock. Some keys, for example, must have the cuts within 0.002 inch of the correct value in order to operate a lock.

One device currently available for use by a locksmith in determining key cut depth is a special micrometer unit, such as depicted as FIG. 1 herein. A generally C-shaped yoke has a permanently affixed knife-shaped edge to engage the cut of the key. A screw-type micrometer is positioned so that the flat end thereof will bear against the edge of the key opposite the cuts. The depth of cut is then read from the barrel of the micrometer. In order to have meaningful depth values, the same amount of torque must be applied to the micrometer for each of the key cuts. Although useful information can be obtained with such a unit, use of the device is very time consuming. Also, considerable care must be exercised in order to read and then record the information. This is particularly true since the key must be held while the micrometer is rotated to a given torque. Furthermore, this device is very difficult to use in determining cut depths of keys having cuts in both edges.

Accordingly, it is an object of the present invention to provide a gauge for quickly and easily determining the depth of cuts in a key.

It is another object of the present invention to provide a reliable and quickly operated gauge wherein the depth of cuts can be determined for keys having cuts on opposite edges thereof.

Another object of the present invention is to provide a gauge that will permit determination of cut depths of keys having a very close spacing between a shoulder and the cut closest to that shoulder.

A further object is to provide a gauge that can also be used to measure the pin lengths needed in a tumbler of a lock.

Still another object of the present invention is to provide a gauge for determining the depth of cuts in a key that is easily "zeroed" and easily read for ascertaining the depths.

These and other objects will become apparent upon a consideration of the accompanying drawings and the detailed description of the same, which follows.

DISCLOSURE OF THE INVENTION

In accordance with the present invention, there is provided an improved gauge for determining the depth of key cuts and the like. This gauge utilizes a spring-biased tip member of a selected configuration adapted for reciprocal movement by a user. This tip member is positioned to contact the bottom of the key cut (or other surface). Oppositely disposed from the tip member is a fixed anvil member for support of a flat edge of the key. This anvil member has a flat surface directed toward the tip member for support of the back edge of a key having cuts in one edge. A transverse groove in this flat surface provides for receipt of one cut edge of a double-cut key. Furthermore, the anvil member is provided with a flat side surface at the entrance to the groove which provides a stop position for keys having an edge shoulder close to the first cut.

BRIEF DESCRIPTION OF THE DRAWINGS

FIG. 1 is a drawing illustrating a depth-of-cut gauge of the prior art.

FIG. 2 is a front elevational view of one embodiment of the present invention.

FIG. 3 is a side elevational view of the embodiment of FIG. 2.

BEST MODE FOR CARRYING OUT THE INVENTION

Figure 4:
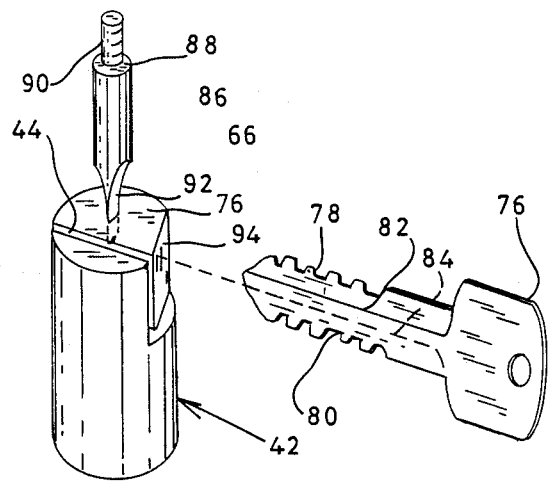
FIG. 4 is an enlarged drawing of the anvil member and the tip member of the embodiment of FIGS. 2 and 3 showing the relationship with a typical double-edged key.

In order to fully appreciate the advantages of the present invention, the following is a description of a typical prior art gauging unit as depicted in FIG. 1. This device has a yoke member 10 adapted to hold a conventional barrel-type micrometer 12 at one end of the yoke, and a knife edge surface 14 directed toward the end of the spindle 16 of the micrometer 12. The micrometer has the conventional barrel 18 for coarse adjustment, and a fine adjustment screw 20. Dimensions are read on a scale 22 on a non-rotating portion of the micrometer and a companion scale 24 on the barrel 18. In this device both the spindle 16 and the barrel 18 rotate as the spindle 16 is advanced or retracted.

In use, a key 26 is placed between the knife edge surface 14 and the end of the spindle 16, with the key cut of interest resting against the knife edge surface. The barrel 18 is rotated until he spindle 16 contacts the back (flat) edge 28 of the key 26, and then the screw 20 is rotated to assure uniform contact pressure. The depth of cut, i.e., the distance from the back of the key to the bottom of the cut, is then read from the scales 22, 24. After determining this depth, the spindle 16 is withdrawn (by rotating the barrel 18) until another cut is placed on the knife edge surface 14, and then the measuring process is repeated. Each cut depth measurement requires this retracting and then advancing of the spindle 16 via rotation of the barrel 18 and the adjustment screw 20. Depending upon the skill of the locksmith operating this prior art device, the time required for determining the depth of cuts for an entire key may require a minute or more.

Referring now to FIGS. 2 and 3, one embodiment of the present invention is illustrated at 30 in a frontal view (FIG. 2) and a side view (FIG. 3). This embodiment is provided with a yoke member 32 with a first leg 34 and a second leg 36 which, together with a back member 38, define a C-shaped opening 40. Mounted within the second leg 36, as with a set screw (not shown), is an anvil member 42 whose long axis is aligned between the first leg 34 and second leg 36. Preferably this anvil is generally cylindrical. Details of this anvil will be discussed hereinafter with regard to FIG. 4; however, it can be seen in FIG. 3 that this anvil 42 is provided with a transverse slot 44.

Mounted from the first leg 34, and extending therethrough along an axis aligned with the axis of the anvil 42, is a dial-type indicator 46 such as Model A1-921 manufactured by the Teclock Corporation of Japan, or Model No. 999-380 manufactured by Mitutoyo, also of Japan. This type of indicator is provided with conventional dial hands 48, 50 and their respective scales. An adjustment for zero position is provided by a rotatable dial 52 which is releasably locked against rotation by a clamp 54 and screw 56. The dial indicator has a projecting sleeve 58, and a set screw (not shown) fastens this sleeve in the first arm 34. Large zero-point adjustments can be accomplished by moving this sleeve axially in the first arm, or by moving the anvil axially in the second arm (after loosening the set screws). The indicator has a reciprocatable but non-rotating spindle 60 that passes through the sleeve 58 and has a distal end within the opening 40, as shown. Furthermore, the spindle 60 extends in an opposite direction, and a knob 62 is attached thereto so as to permit a user to move the spindle in a direction indicated by the arrow 64. Some of the commercial dial indicators are provided with an apertured projection 65 on the rear surface that can be used to mount the device on a support.

The distal end of the spindle 60 carries a replaceable tip member 66 which will be described in more detail hereinafter. Preferably, the distal end of the spindle 60 is bored and tapped so as to receive a threaded portion of the tip 66 (See FIG. 4). A biasing member 68 (e.g., a spring) surrounds the spindle 60, with a first end bearing against a distal end of the sleeve 58, and a second end against a washer (preferably metallic) 70. This spring augments an internal spring (not shown) within the indicator 46. This washer 70 is clamped between the distal end of the spindle 60 and a shoulder of the tip member 66. Preferably a second washer 72 of resilient material (e.g., neoprene) is placed against the metallic washer 70 whereby rotational orientation of the tip member 66 with respect to the anvil can effected.

With the embodiment 30 of FIGS. 2 and 3, the "zero" or reference position is the flat end surface 74 of the anvil member 42. The aforementioned spring 68 holds the tip member 66 against this surface. The dial 52 can be rotated to the zero position of the hand 48 so that raising the tip member 66, as by moving the knob 62 away from the surface of the indicator 46, causes the hands 48, 50 to record the distance of movement. Thus, with a key mounted on the anvil member 42 and the tip member 66 resting in a key cut, the depth of the key cut can be instantly read by a locksmith. The knob can be operated quickly so that an entire key can be "read" in only a few seconds.

The unique anvil member 42 and tip member 66 of the present invention are shown enlarged in FIG. 4. The relationship of these components to a typical double cut key 76 is shown. By "double cut" is meant a key with duplicate cuts along opposite edges as at 78, 80. This is typical of a number of vehicle keys, for example. This type of key has flat "reference surfaces" 82, 84, as indicated. It is these reference surfaces that are used to determine the depth of the cuts along the edges. From this drawing it can be seen that the slot 44 in the anvil member provides for the acceptance of a portion of the key 76 as the reference surface 84 is supported on the top surface 76 of the anvil member.

This FIG. 4 illustrates in more detail the tip member 66. This embodiment of a tip has a substantially cylindrical body portion 86 having a shoulder 88 at a transition to a treaded portion 90. The opposite end terminates, in this used to contact the key cuts (or the top of the anvil member for zero reference position). The edge 92 is oriented perpendicularly to the direction of the slot 44 so as to most accurately contact the surface of a key cut. This orientation is the reason for the aforementioned resilient washer 72 (FIG. 2) since this washer permits approximately ¼ of a turn of the tip member 66 in the spindle 60 of the indicator.

Keys that are not double-cut are generally thicker and have a straight back edge. For the gauging of the depth of cuts therein, this straight edge is placed upon the anvil top surface 76, and the edge 92 of the tip member 66 is brought to bear upon the cut whose depth is to be determined. Certain of these keys, however, have a shoulder (not shown) along the straight edge that is closely spaced to the first cut on the opposite edge. In order that the anvil member 66 can accommodate a key with this type of shoulder, the anvil is provided with a flat side surface 94 faced toward the direction of the key. This permits movement of the key across the top surface 76 of the anvil member such that the edge 92 of the tip member can engage the first cut of the key.

Figure 5:
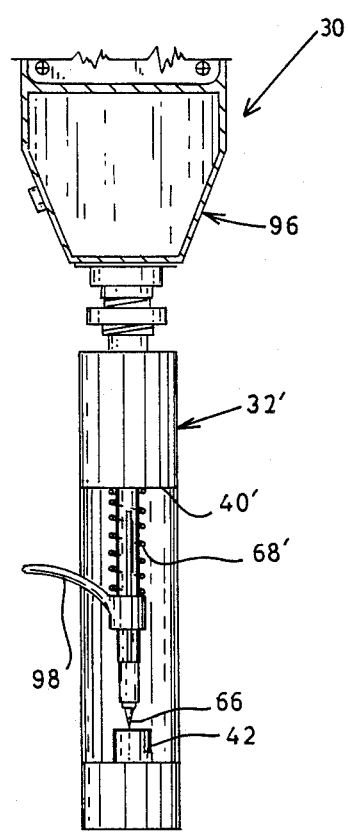
FIG. 5 is a front elevational view of another embodiment of the present invention, partially cut away.

Another embodiment of the present invention is depicted at 30' in FIG. 5. This embodiment functions in a manner similar to that of FIGS. 2 and 3; however, there are physically some differences. For example, the yoke 32' is larger than that of the prior embodiment and, in particular, the opening 40' is larger. This particular embodiment is shown as having a digital readout unit 96 such as available from Mitutoyo of Japan which has a range of 0.0005 to one inch. Of course, other indicators can be used. In this embodiment, the spindle of the indicator is raised through the use of a lever arm 98 so as to lift or lower the tip member 66 with respect to the anvil member 42. A spring 68' is again used to bias the tip member toward the anvil member. This embodiment performs the same type of measurements as described above with regard to the embodiment of FIGS. 2 and 3.

Figure 6:
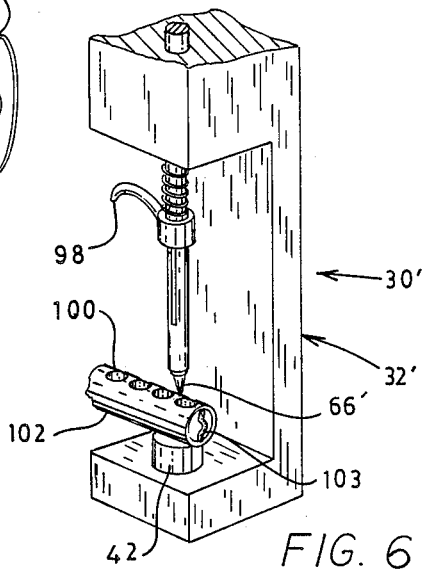
FIG. 6 is a partially cut-away drawing illustrating the use of the embodiment of FIG. 5 for the determination of the pin lengths required for use in a lock tumbler.
Figure 7:
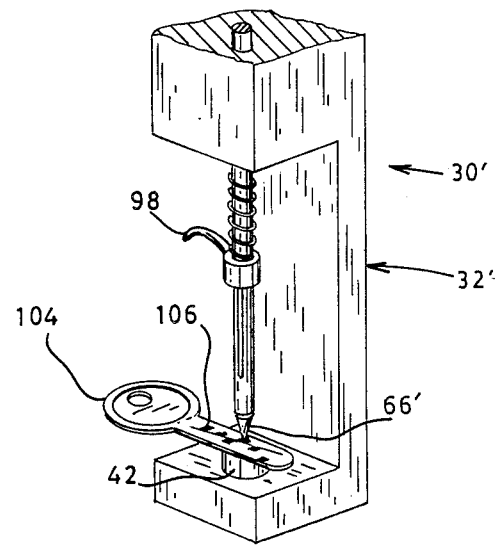
FIG. 7 is a partially cut-away drawing illustrating the use of the embodiment of FIG. 5 for the determination of the depth of the dimple in the side surface of certain keys.

FIGS. 6 and 7 depict other uses for the embodiment of FIG. 5 (although the embodiment of Figures of 2 and 3 can be used for the same measurements). For example, in FIG. 6 is depicted the measuring of the length of tumbler pins required in their respective holes 100 in a lock cylinder 102. For this application, a pointed tip member 66' is fastened to the spindle of the measuring means. With the cylinder 102 resting on the anvil 42, the tip member 66' is first placed against the upper surface of the cylinder 102 to establish a zero point. After a cut key is inserted in the cylinder at 103, the tip member 66' is lowered into each hole 100 to contact the cut of the key and thus measure the length of the tumbler pin required for that hole.

As stated above, some keys are manufactured with dimple-like depressions in the side surfaces thereof.

Follower pins in a lock tumbler cooperate with these depressions for operating the lock. Shown in FIG. 7 is a key 104 of this type having the surface depressions 106. The depth of these depressions is determined using the pointed tip member 66' as in the case of the pin depth of FIG. 6.

From the foregoing it will be understood by those versed in the art that an improved device is provided to quickly and accurately determine the dimensions of the cuts in keys and related items. The invention is not limited to the type of measuring instrument, but depends primarily upon the configuration and relationship of the anvil member and the tip member. The embodiments described herein are not given as a limitation to the invention. Rather, the invention is to be limited only by the appended claims and their equivalents when read in light of the full description of the invention.

I claim:

1. A gauging device for the rapid and accurate measurement of the depth of cut in keys, which comprises:
   a yoke member having first and second substantially parallel leg members and a back member, said leg members and said back member defining a C-shaped opening;
   an anvil member carried by said second leg member, said anvil member having a flat surface directed toward said first leg member, said flat surface being a reference point for said gauge;
   a reciprocatable and non-rotating spindle member carried by said first leg member, said spindle member having an axis oriented perpendicularly to said flat surface of said anvil member, said spindle member having a first end and a distal end;
   a displacement measuring means attached to said first end of said spindle member, said displacement measuring means providing visual readout of axial displacement of said spindle member from said reference point;
   a tip member threadably secured to said distal end of said spindle member for selective contact with said flat surface of said anvil member to zero said gauge and selective contact with the cut of the key being measured to axially displace said spindle member; and
   means to bias said tip member toward said flat surface of said anvil member.

2. The gauging device of claim 1 wherein said flat surface of said anvil member is provided with a transverse slot to accept one edge of a double cut key during measurement of the depth of cut in the second edge of said double cut key.

3. The gauging device of claim 2 wherein said anvil member is substantially cylindrical wherein said slot is displaced from said axis of, said anvil member, said slot having a first end to slidably receive said key, and wherein said anvil member has a flat side face at said first end of said slot, said flat side face being parallel with said axis of said anvil member.

4. The gauging device of claim 2 wherein said tip member has a chisel-shaped distal end with a straight edge for selective contact with said flat surface of said anvil member and to selectively contact said cuts of the key, said distal chisel-shaped end oriented so said straight edge thereof is substantially perpendicular to said slot in said anvil member.

5. The gauging device of claim 1 wherein said biasing means is a spring means encircling said spindle member, one end of said spring means fixedly bearing against said displacement measuring means and a second end of said spring means bearing upon a shoulder on said tip member.

6. The gauging device of claim 5 further comprising:
   a first washer of an abrasion resistant material interposed between said shoulder of said tip member and said distal end of said spindle member for contact by said second end of said spring means; and
   a second washer of a resilient material interposed between said first washer and said shoulder of said tip member.

7. The gauge device of claim 1 wherein said displacement measuring means is a circular dial indicator with rotating hands to accurately indicate axial displacement of said spindle member due to movement of said tip member from said flat surface of said anvil member.

8. The gauge device of claim 1 wherein said device to accurately indicate axial displacement of said spindle member due to movement of said tip member from said flat surface of said anvil member.

9. A gauging device for the rigid and accurate measurement of the depth of cuts in keys, which comprises:
   a yoke member having first and second substantially parallel leg members joined to a back member, said leg members and said back member defining a C-shaped opening;
   a substantially cylindrical anvil member carried by said second leg member, said anvil member having a flat end surface directed toward said first leg member, said flat surface being a reference point for said gauge;
   a reciprocatable and non-rotating spindle member carried by said first leg member, said spindle member having an axis oriented perpendicularly to said flat surface of said anvil member, said spindle member having a fist end and a distal end;
   a displacement measuring means attached to said first end of said spindle member, said displacement measuring means providing visual readout of axial displacement of said spindle member from said reference point;
   a tip member threadably secured to said distal end of said spindle member for selective contact with said flat surface of said anvil member to zero said gauge and selective contact with said cuts of said key to axially displace said spindle member; and
   spring means to bias tip member toward said flat surface of said anvil member.

10. The gauging device of claim 9 wherein said flat surface of said anvil member is provided with a transverse slot to accept one edge of a double cut key during measurement of the depth of cut in the second edge of said double cut key.

11. The gauging device of claim 10 wherein said anvil member has an axis aligned with said spindle member, wherein said slot is displaced from said axis of said anvil member, said slot having a first end to slidably receive said key, and wherein said anvil member has a flat side face at said first end of said slot, said flat side face being parallel with said axis of said anvil member.

12. The gauging device of claim 10 wherein said tip member has a chisel-shaped distal end with a straight edge for selective contact with said flat surface of said anvil member and to selectively contact said cuts of the key, said distal chisel-shaped end oriented so said straight edge is substantially perpendicular to said slot in said anvil member.

13. The gauging device of claim 9 wherein one end of said spring means fixedly bears against said displacement measuring means and a second end of said spring means bears upon a shoulder on said tip member.

14. The gauging device of claim 13 further comprising:
- a first washer of an abrasion resistant material interposed between said shoulder of said tip member and said distal end of said spindle member for contact by said second end of said spring means; and
- a second washer of a resilient material interposed between said first washer and said shoulder of said tip member.

15. The gauge device of claim 9 wherein said displacement measuring means is a circular dial indicator with rotating hands to accurately indicate axial displacement of said spindle member due to movement of said tip member from said flat surface of said anvil member.

16. The gauge device of claim 9 wherein said displacement measuring means is a digital readout device to accurately indicate axial displacement of said spindle member due to movement of said tip member from said flat surface of said anvil member.

17. A gauging device for the rigid and accurate measurement of the depths of cuts in keys, which comprises:
- a yoke member having first and second substantially parallel leg members joined to a back member, said leg members and said back member defining a C-shaped opening;
- a reciprocatable and non-rotating spindle member carried by said first leg member, said spindle member having a first end and a distal end, said distal end extending into said C-shaped opening:
- a substantially cylindrical anvil member carried by said second leg member, said anvil member having an axis aligned with said spindle member and having a flat end surface directed toward said first leg member, said flat surface being a reference point for said gauge, said flat surface being provided with a transverse slot displaced from said axis of said anvil member to accept one edge of a double cut key during measurement of the depth of cut in the second edge of said double cut key, said anvil member having a flat side face at a first end of said slot, said flat side face being parallel with said axis of said anvil member;
- a tip member carried by said distal end of said spindle member for selective contact with said first flat surface of said anvil member to zero said gauge, and for selective contact with the cut of the key being measured to axially displace said spindle member;
- biasing means to bias said tip member toward said flat surface of said anvil member; and
- a displacement measuring means attached to said first end of spindle member, said displacement measuring means providing visual readout of axial displacement of said spindle member from said reference point.

18. The device of claim 17 wherein said tip member is threadably secured to said distal end of said spindle member, said tip member being provided with a shoulder toward said spindle member.

19. The device of claim 17 wherein said biasing means is a spring means encircling said spindle member, one end of said spring means fixedly bearing against said displacement measuring means and a second end of said spring means directed toward said tip member, said device further comprising:
- a first washer of an abrasive resistant material interposed between said shoulder of said tip member and said second end of said spring means; and
- a second washer of a resilient material interposed between said first washer and said shoulder of said tip member.

* * * * *